(12) United States Patent
Guo et al.

(10) Patent No.: US 7,989,698 B2
(45) Date of Patent: Aug. 2, 2011

(54) FLIP-TYPE ELECTRONIC APPARATUS

(75) Inventors: Shi-Kun Guo, Shenzhen (CN); Jin-Feng Liu, Shenzhen (CN); Qia-Kai Xie, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 540 days.

(21) Appl. No.: 12/195,420

(22) Filed: Aug. 21, 2008

(65) Prior Publication Data

US 2009/0154075 A1    Jun. 18, 2009

(30) Foreign Application Priority Data

Dec. 14, 2007  (CN) .......................... 2007 1 0203074

(51) Int. Cl.
*H05K 7/00*    (2006.01)
(52) U.S. Cl. ........... 174/50.51; 361/679.08; 361/679.55; 312/223.1; 70/58
(58) Field of Classification Search ............... 174/50.51; 361/679.08, 679.55; 312/223.1; 292/24; 70/58
See application file for complete search history.

(56) References Cited

U.S. PATENT DOCUMENTS

| | | | |
|---|---|---|---|
| 7,282,641 B2 * | 10/2007 | Ueno | 174/50.51 |
| 7,463,482 B2 | 12/2008 | Chien et al. | |
| 7,617,706 B1 * | 11/2009 | Kuo | 70/58 |
| 7,675,742 B2 * | 3/2010 | Wu et al. | 361/679.08 |
| 7,855,874 B2 * | 12/2010 | Nakajima et al. | 361/679.02 |
| 7,916,474 B2 * | 3/2011 | Wu et al. | 361/679.55 |

FOREIGN PATENT DOCUMENTS

CN    200990733 Y    12/2007

* cited by examiner

*Primary Examiner* — Dhiru R Patel
(74) *Attorney, Agent, or Firm* — Frank R. Niranjan

(57) ABSTRACT

An exemplary electronic apparatus (100) includes a main body (10), a lid (20) connecting with and rotating with respect to the main body between an opened position and a closed position, and a sliding bar (35) located in the main body. The main body defines a fastening hole (137), and includes a block portion (132) extending upwardly from an outer edge of the fastening hole. The block portion includes a side block portion (131) and a top block portion (134) connecting with the side block portion. The lid includes a hook (31) aligning with the fastening hole. The sliding bar includes a main bar (351) movably fastened onto the main body, a limiting portion (353) extending from the main bar, and a hook portion (357) extending from the limiting portion for fastening onto the hook. The limiting portion is blocked between the side block portion and the top block portion.

12 Claims, 7 Drawing Sheets

FLIP-TYPE ELECTRONIC APPARATUS

BACKGROUND

1. Technical Field

The present invention generally relates to electronic apparatuses, and particularly to a flip-type electronic apparatus.

2. Description of Related Art

With the continuing development of scientific technology, flip type electronic apparatuses such as notebook computers and portable digital video disk (DVD) players have been widely used due to their convenience and practicality.

A notebook computer generally includes a main body and a lid. Each of the main body and the lid has a first side and a second side opposite to the first side. The lid is pivotably connected with the main body and rotates, with respect to the main body, between an opened position and a closed position. When the lid is at the opened position, the second side of the lid is away from, but faces, the second side of the main body. When the lid is at the closed position, the second side of the lid is in contact with and fastened to the second side of the main body by a fastening assembly. The fastening assembly can provide a fastening force along a direction which is vertical to the main body and the lid, in order to prevent the lid from disengaging from the main body. However, the fastening force can also compel the fastening assembly to rotate, which reduces the fastening stability of the lid and the main body.

What is needed, therefore, is an electronic apparatus which overcomes the above-described problems.

SUMMARY

The present invention relates to an electronic apparatus. According to an exemplary embodiment, the electronic apparatus includes a main body, a lid connecting with and rotating with respect to the main body between an opened position and a closed position, and a sliding bar located in the main body. The main body defines a fastening hole, and includes a block portion extending upwardly from an outer edge of the fastening hole. The block portion includes a side block portion and a top block portion connecting with the side block portion. The lid includes a hook aligning with the fastening hole. The sliding bar includes a main bar movably fastened onto the main body, a limiting portion extending from the main bar, and a hook portion extending from the limiting portion for fastening onto the hook. The limiting portion is blocked between the side block portion and the top block portion.

Other advantages and novel features of the present invention will become more apparent from the following detailed description of embodiment when taken in conjunction with the accompanying drawings.

DETAILED DESCRIPTION OF THE EMBODIMENTS

Figure 1:
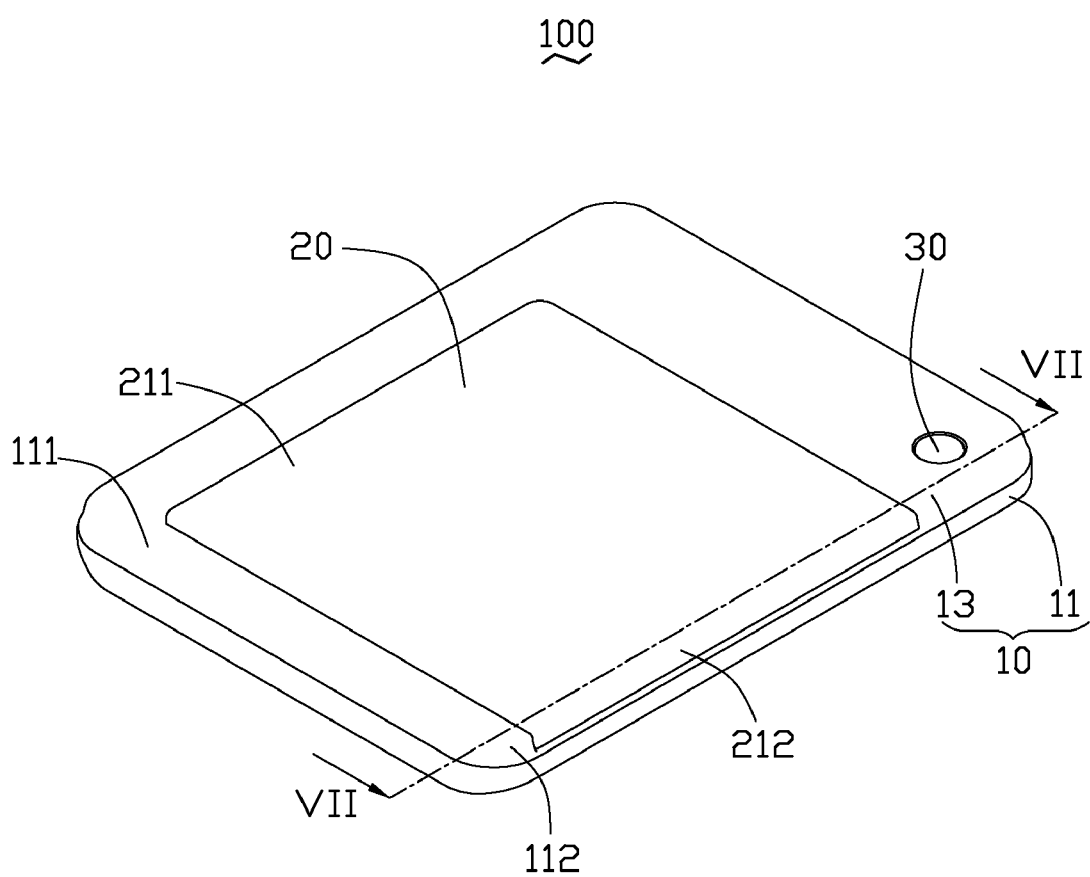
FIG. 1 is an assembled, isometric view of a flip-type electronic apparatus in accordance with an exemplary embodiment of the present invention.

Reference will now be made to the drawing figures to describe the various present embodiments in detail.

Figure 2:
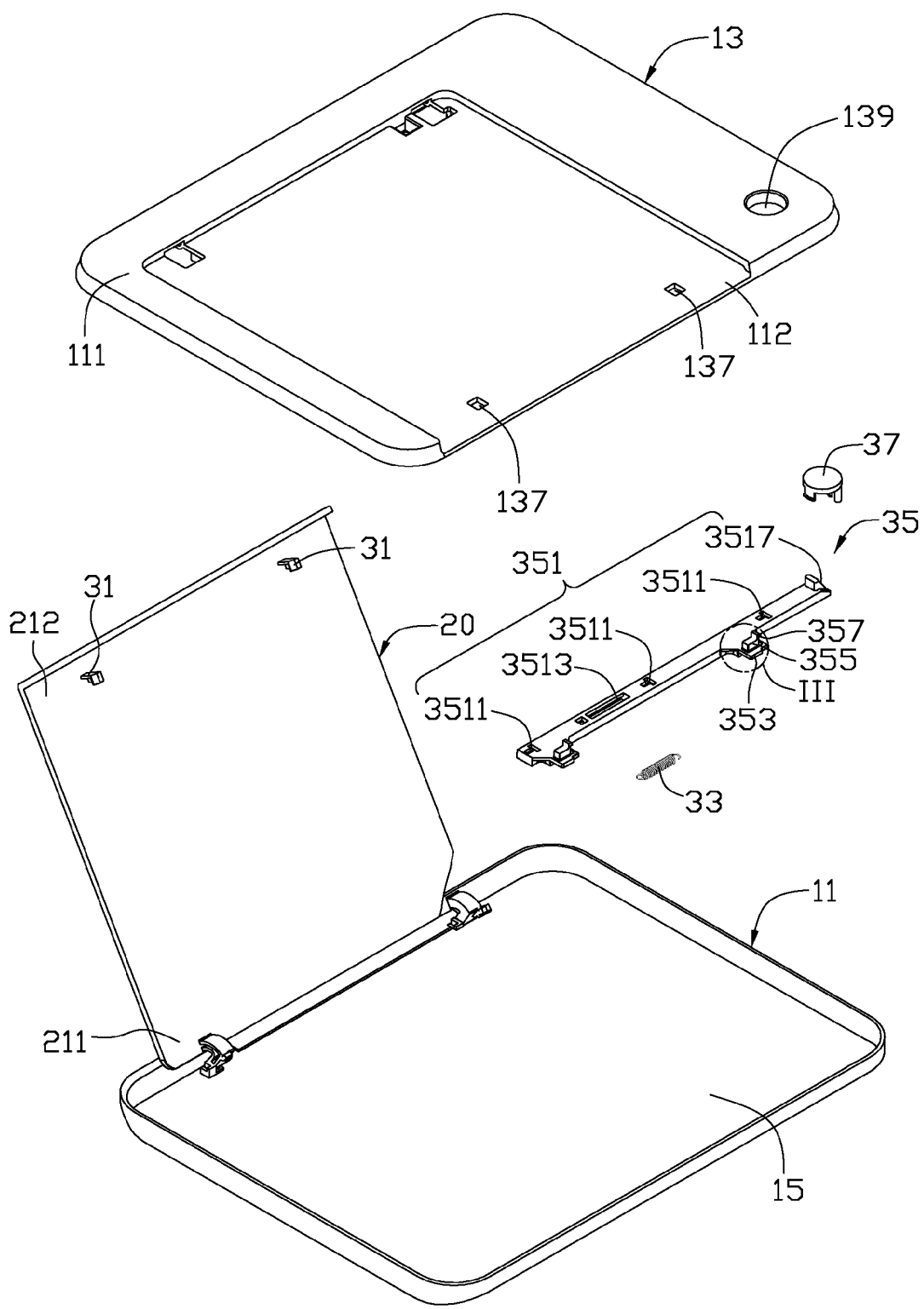
FIG. 2 is an exploded, isometric view of the electronic apparatus of FIG. 1.

Referring to FIGS. 1 and 2, a flip-type electronic apparatus 100 in accordance with an exemplary embodiment of the present invention is shown. The electronic apparatus 100 is a notebook computer in the present embodiment. It should be understood that the electronic computer 100 can be a portable DVD player, a mobile phone, and a game player, among other apparatus.

The flip-type electronic apparatus 100 includes a main body 10, a lid 20, and a fastening assembly 30. The main body 10 has a first side 111 and a second side 112 opposite to the first side 111. The lid 20 has a first side 211 and a second side 212 opposite to the first side 211. The first side 211 of the lid 20 is pivotably connected to the first side 111 of the main body 10, so that the lid 20 can be rotated between an opened position and a closed position, with respect to the first side 111 of the main body 10. The fastening assembly 30 fastens the second side 212 of the lid 20 onto the second side 112 of the main body 10 when the lid 20 is at the closed position.

The main body 10 includes a base 11 and an operating board 13 fixed on the base 11. The base 11 defines a receiving space 15 therein for receiving a circuit board (not shown) and other components.

As shown in FIG. 2, the operating board 13 defines two fastening holes 137 and an operating hole 139 at the second side 112. The fastening holes 137 and the operating hole 139 extend through the operating board 13.

Figure 4:
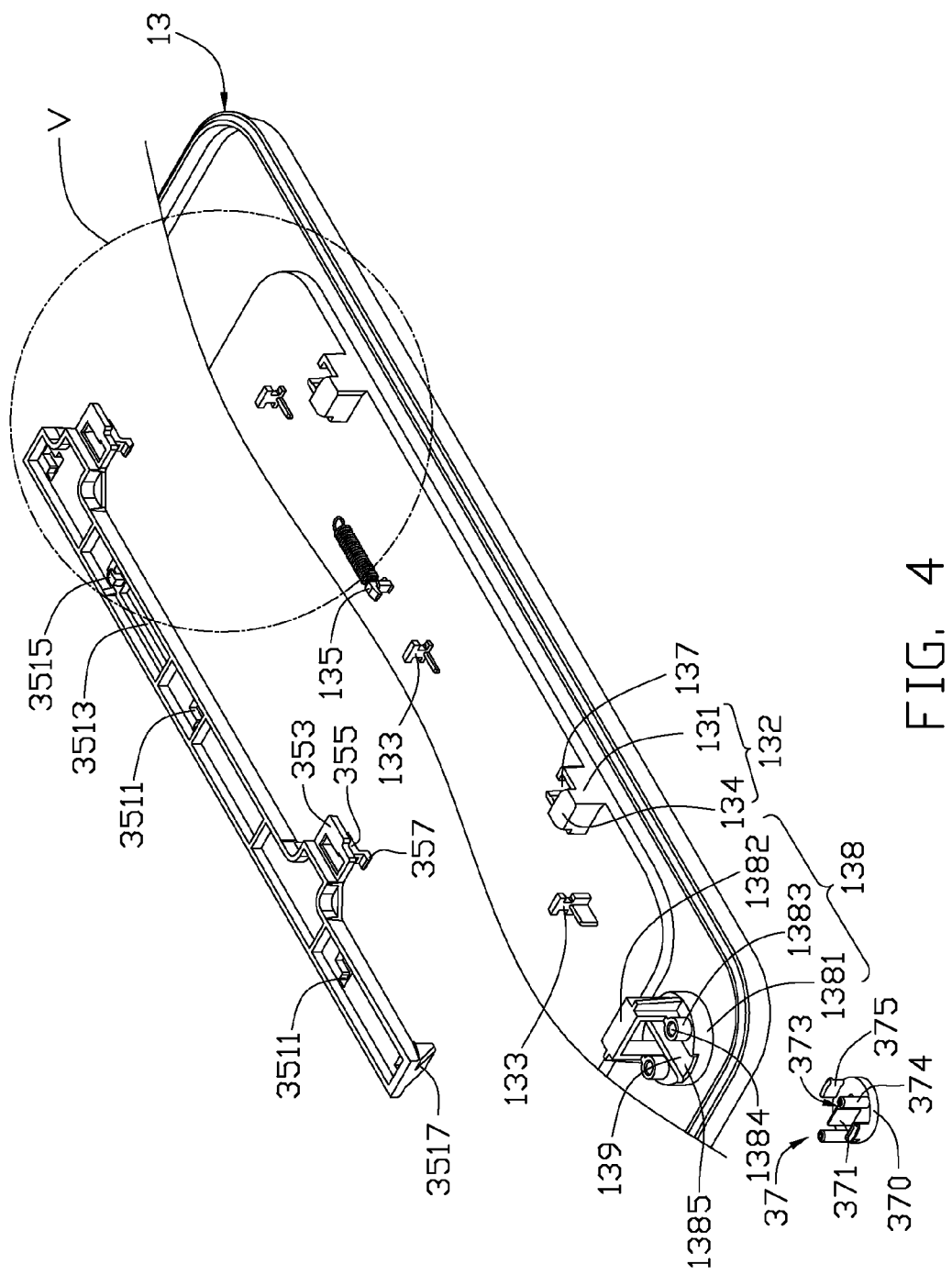
FIG. 4 is an exploded, isometric view of a part of the electronic apparatus similar to FIG. 2, but viewed from a bottom-to-top aspect.

Referring to FIG. 4, the operating board 13 has a supporting portion 138, two block portions 132, three fixing portions 133, and a first orienting portion 135, all of which are at a bottom surface of the operating board 13 and face the receiving space 15 of the base 11. The fixing portions 133 are separately arranged on the operating board 13 and align with each other. The first orienting portion 135 is located between two adjacent fixing portions 133, and has a hooked configuration.

The supporting portion 138 includes a cap 1381, a frame 1382, and two posts 1383. The cap 1381 extends upwardly from the supporting portion 138 and covers over the operating hole 139. The cap 1381 defines a gap 1385 through a top surface thereof. The gap 1385 is substantially rectangular and communicates with the operating hole 139. The frame 1382 is U-shaped, with two free ends integrally connected with the top surface of the cap 1381. The posts 1383 extend upwardly from the top surface of the cap 1381, respectively, and are symmetrical respect with to the gap 1385. Each post 1383 defines a post hole 1384 in communication with the operating hole 139.

Figure 5:
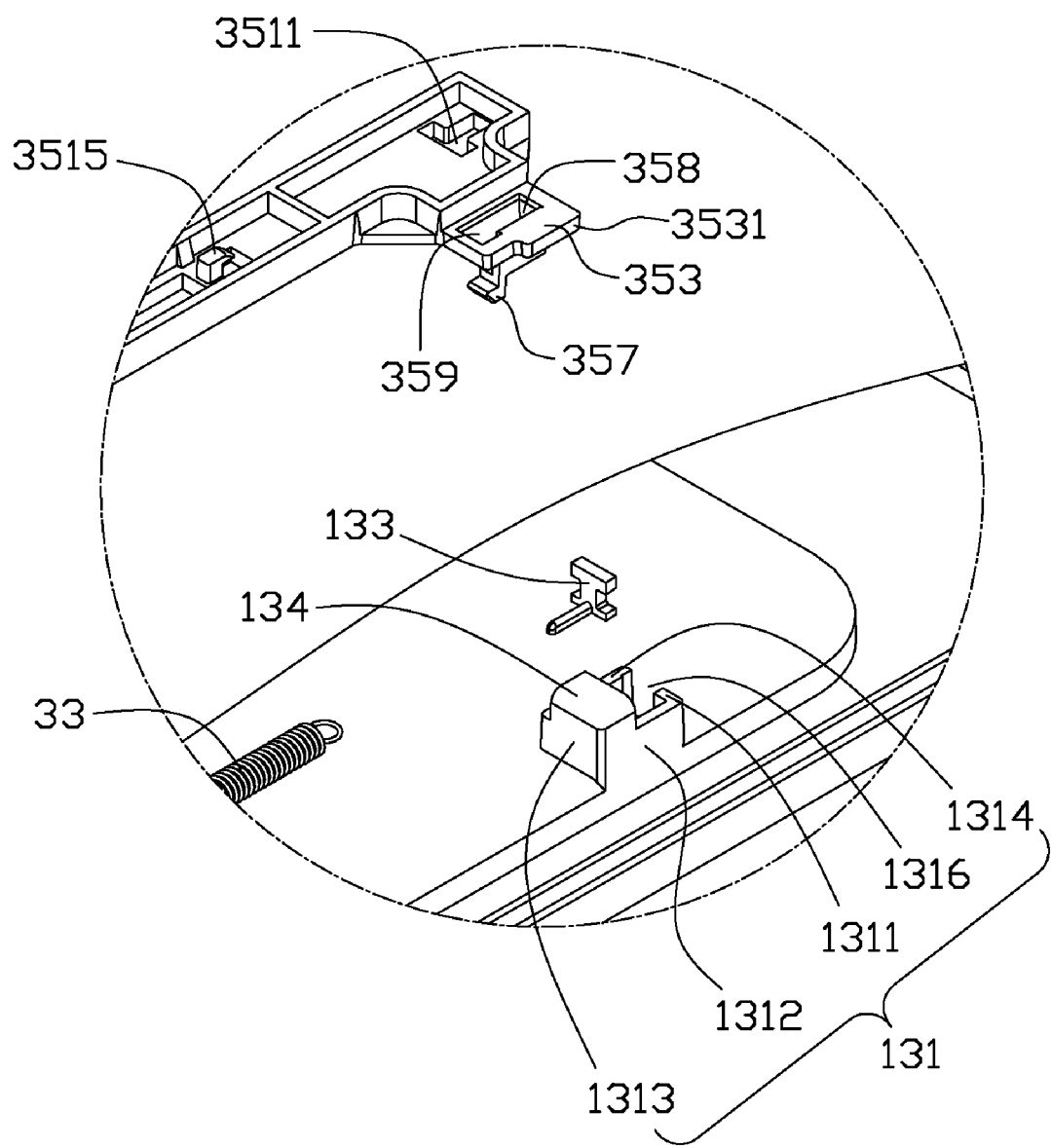
FIG. 5 is an enlarged view of a circled portion V of the electronic apparatus of FIG. 4.

Each block portion 132 extends upwardly from an outer edge of a corresponding fastening hole 137, and includes a side block portion 131 and a top block portion 134. The side block portion 131 integrally connects the top block portion 134 with the operating board 13. Referring to FIG. 5, the side block portion 131 includes a first side wall 1311, a second side wall 1312, a third side wall 1313, and a fourth side wall 1314. The first side wall 1311 is parallel to the third side wall 1313, while the second side wall 1312 is parallel to the fourth side wall 1314. The first side wall 1311 and the fourth side wall 1314 cooperatively define an opening 1316 therebetween. The third side wall 1313 and a portion of the second side wall 1312 upwardly protrude out of the first side wall 1311 and the fourth side wall 1314 (viewed from FIG. 5). The top block portion 134 has a planar plate configuration, and is parallel to the operating board 13. The top block portion 134 connects with a top surface of the third side wall 1313 and a top surface of the protruded portion of the second side wall 1312, so that the top block portion 134 has a distance spacing from the first side wall 1311, another portion of the second sidewall 1312 and the fourth side wall 1314 along a vertical direction.

Referring, again, to FIGS. 1 and 2, the fastening assembly 30 includes two hooks 31 located at the second side 212 of the lid 20, a sliding bar 35 located at the second side 112 of the main body 10, an elastic member 33 fixed on the sliding bar 35 (shown in FIG. 6), and a pressing key 37 fixed in the operating hole 139. The hooks 31 space from each other, and each respective hook 31 aligns with a respective fastening hole 137 in the operating board 13.

The sliding bar 35 includes a main bar 351, two limiting portions 353 extending outwardly from a lateral side of the main bar 351, two extending portions 355 respectively extending up from the limiting portions 353, and two hook portions 357 respectively protruding out from the extending portions 355. The main bar 351 has a strip shape, and defines three T-shaped sliding grooves 3511 therethrough. Each respective sliding groove 3511 is used to receive a respective fixing portion 133 of the operating board 13. The main bar 351 further includes an elongated opening 3513 located between two adjacent sliding grooves 3511. The elongate opening 3513 is used to receive the elastic member 33. A hooked second orienting portion 3515 (shown in FIG. 4) extends from the main bar 351 at a position adjacent to the elongated opening 3513. In addition, the main bar 351 further includes a cooperating surface 3517 at one end thereof. The cooperating surface 3517 is an inclined surface for cooperating with the pressing key 37.

Figure 3:
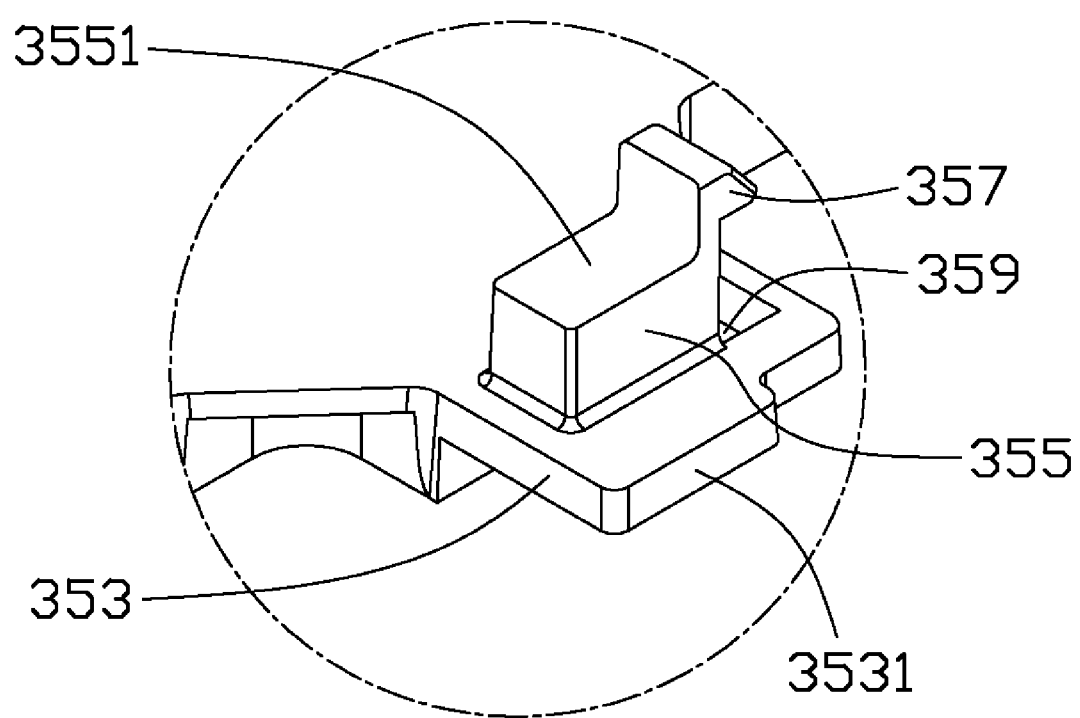
FIG. 3 is an enlarged view of a circled portion III of the electronic apparatus of FIG. 2.

Referring to FIGS. 2 and 3, each respective limiting portion 353 aligns with a respective block portion 132. Each limiting portion 353 is flake-shaped, and protrudes a rectangular protrusion 3531 from a portion of a lateral side thereof. Each extending portion 355 has a planar surface 3551 at a top end thereof. The planar surface 3551 is parallel to a top surface of the limiting portion 353. Each respective hook portion 357 upwardly extends from one lateral side of the planar surface 3551 of a respective extending portion 355. Each hook portion 357 is used to hook the hooks 31 on the lid 20, whereby the lid 20 is fastened onto the main body 10.

Referring to FIGS. 3 and 5, the sliding bar 35 defines a slug hole 358 and a demould hole 359 (shown in FIG. 5) in communication with the slug hole 358. The slug hole 358 extends through the limiting portion 353 and into the extending portion 355, which reduces the thicknesses of the limiting portion 353 and the extending portion 355. Furthermore, due to the slug hole 358, the limiting portion 353 and the extending portion 355 can have a same thickness in every position. It is well known that the plastic having a larger thickness is easy to dehydrate and thus deform. Especially, when the plastic has a different thickness in different position, the deformation is more obvious. Accordingly, the slug hole 358 can prevent the limiting portion 353 and the extending portion 355 from being deformed. The demould hole 359 extends through the limiting portion 353 and faces the hook portion 357. Accordingly, the hook portion 357 can be formed via a male mold, which reduces the producing cost of the electronic apparatus 100.

The elastic member 33 is located in the elongated opening 3513 of the main bar 351. One end of the elastic member 33 is used to engage with the first orienting portion 135, and the opposite end of the elastic member 33 is used to engage with the second orienting portion 3515. In the present embodiment, the elastic member 33 is a spring.

The pressing key 37 is fixed in the operating hole 139 of the operating board 13. Referring to FIG. 4, the pressing key 37 includes a base 370, a block 371 extending upwardly from a middle of the base 370, two poles 374 extending upwardly from an outer edge of the base 370, and two hooks 375 alternately arranged with the poles 374. The base 370 is round plate-shaped. The block 371 has an inclined sliding surface 373, which can cooperate with the cooperating surface 3517 of the sliding bar 35. The block 371 has a height larger than that of the hooks 375. Each respective pole 374 is inserted into a respective post hole 1384 of the post 138. The hooks 375 pass through the gap 1385 of the supporting portion 138 and are fastened on the cap 1381 of the supporting portion 138.

Figure 6:
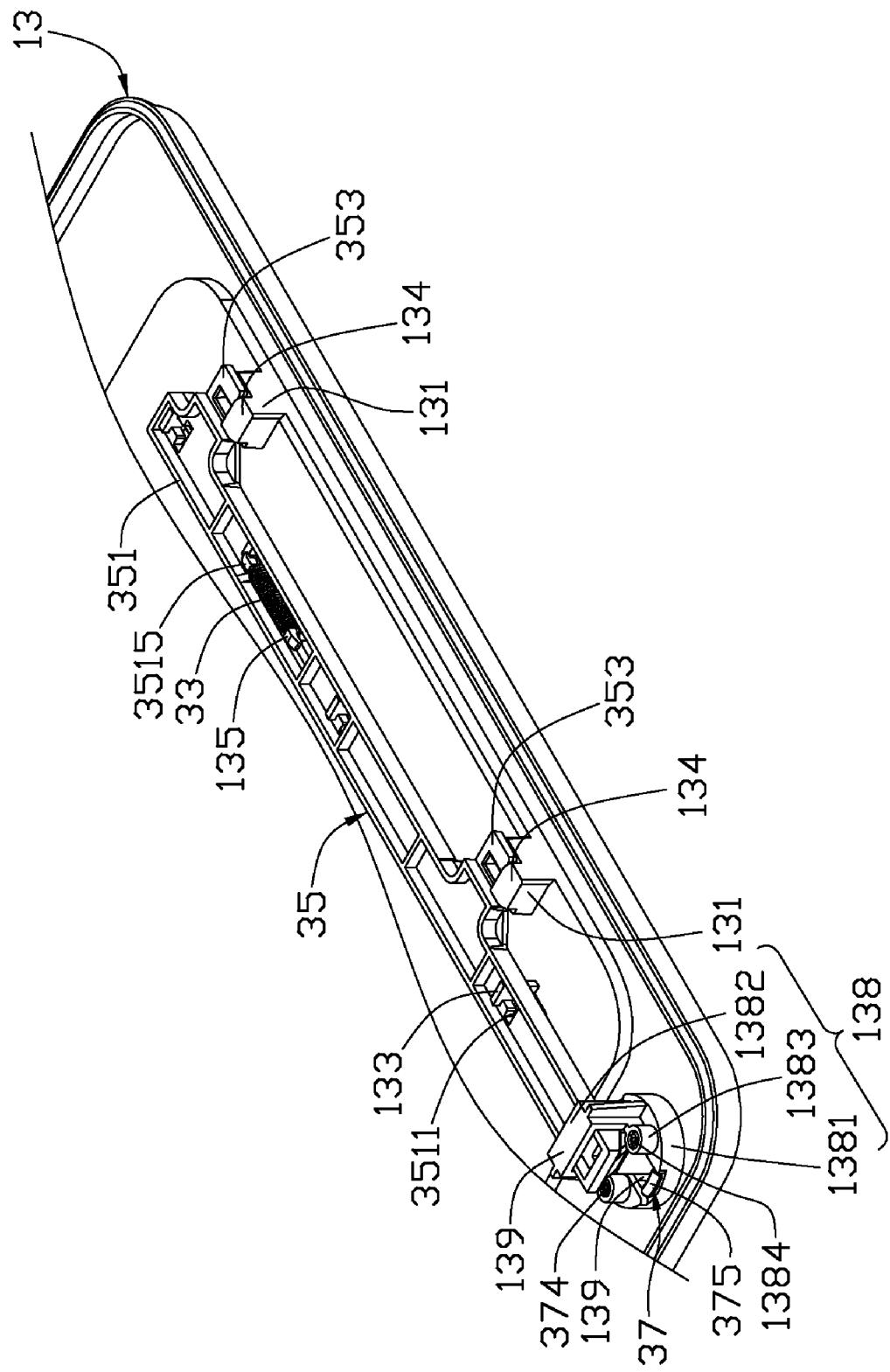
FIG. 6 is an isometric view showing a sliding bar fastening on a main body of the electronic apparatus of FIG. 1, but viewed from a bottom-to-top aspect.

Referring to FIG. 6, during assembly, each fixing portion 133 of the operating board 13 is aligned with and inserted into the corresponding sliding grooves 3511 of the sliding bar 33. The first orienting portion 135 of the operating board 13 is aligned with and inserted into the elongated opening 3513 of the sliding bar 35. The sliding bar 35 slides in the elongated opening 3513 along a direction towards the pressing key 37, which movably fastens the sliding bar 35 onto the operating board 13. Meanwhile, the extending portions 355 and the hooked portions 357 are slid into the corresponding block portion 132 of the operating board 13 via the openings 1316 of the block portions 132. Each limiting portion 353 of the sliding bar 35 is disposed between the side block portion 131 and the top block portion 134 of the corresponding block portion 132. The protrusion 3531 of the limiting portion 353 abuts against the protruded portion of the second side wall 1312. At the same time, the end of the sliding bar 35 is slid into the supporting portion 138, with the cooperating surface 3517 of the sliding bar 35 cooperating with the sliding surface 373 of the pressing key 37. The elastic member 33 is disposed into the elongated groove 3513 of the sliding bar 35, with one end thereof engaged with the first orienting portion 135 of the operating board 13 and the opposite end thereof engaged with the second orienting portion 3515 of the sliding bar 35.

Figure 7:
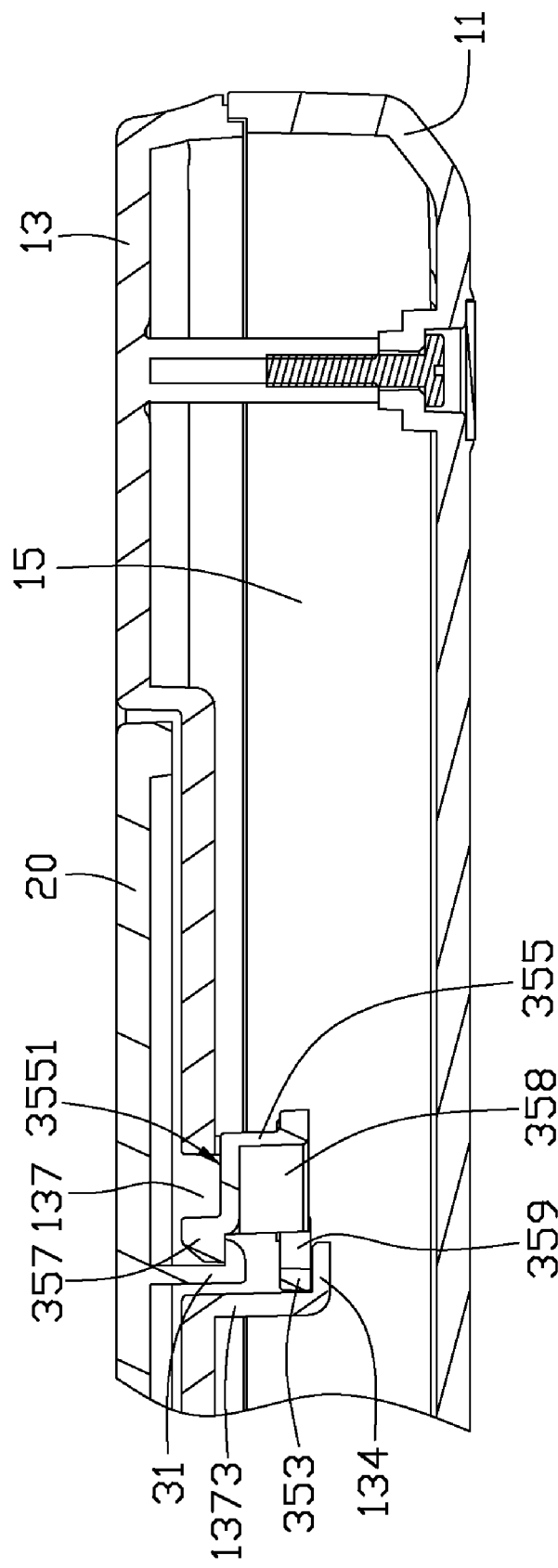
FIG. 7 is a cross-sectional view of a part of the electronic apparatus of FIG. 1, taken along line VII-VII thereof.

Referring to FIG. 7, during operation, the lid 20 is rotated to the closed position. Each hook 31 on the lid 20 passes through the corresponding fastening hole 137, and is fastened onto the corresponding hook portion 357 of the sliding bar 35. At this time, the elastic member 33 is at a natural state. To open the lid 20, the pressing key 37 can be pressed. The sliding surface 373 of the pressing key 37 cooperates with the cooperating surface 3517 of the sliding bar 35, which compels the sliding bar 35 to slide along a direction away from the pressing key 37. At this time, the elastic member 33 elongates, and the hook portions 357 slide together with the sliding bar 35 to disengage from the hook 31 on the lid 20. Accordingly, the lid 20 can be opened. When the pressing key 37 is released, the sliding bar 35 slides towards the pressing key 37 and back to the previous position under a resilient force generated by the elastic member 33.

When the hook 31 on the lid 20 is fastened onto the corresponding hook portion 357 of the sliding bar 35, a fastening force on the hook portion 357 is generated along a direction which is vertical to the main body 10 and the lid 20. As a result, the hook portion 357 tends to rotate around a sliding direction of the sliding bar 35. However, in the flip-type electronic apparatus 100, the limiting portion 353 is blocked between the side block portion 131 and the top block portion 134 of the corresponding block portion 134. Accordingly, when the hook 31 on the lid 20 is fastened onto the corresponding hook portion 357 of the sliding bar 35, the block portion 134 can prevent the hook portion 357 from rotating around the sliding direction of the sliding bar 35, which improves the fastening stability of the lid 20 and the main body 10. In addition, the first, second, third, fourth side walls 1311, 1312, 1313, 1314 of the side block portion 131 enclose the extending portion 355 and the hook portions 357 therebetween. Accordingly, the side block portion 131 can block dust and static charge into the flip type electronic apparatus 100.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic apparatus comprising:
a main body, having a first side and a second side opposite to the first side, and defining a fastening hole at the second side thereof, and the main body comprising a block portion extending upwardly from an outer edge of the fastening hole, the block portion comprising a side block portion and a top block portion connecting with the side block portion;
a lid having a first side and a second side opposite to the first side, the first side of the lid pivotably connecting with the first side of the main body and rotating with respect to the main body between an opened position and a closed position, the lid comprising a hook aligning with the fastening hole at a second side thereof;
a sliding bar being located in the main body, and comprising a main bar, a limiting portion and a hook portion, the main bar being movably fastened onto the main body, the limiting portion extending from the main bar, the hook portion extending from the limiting portion for fastening onto the hook on the lid, the limiting portion being blocked between the side block portion and the top block portion of the block portion.

2. The electronic apparatus of claim 1, wherein the top block portion has a planar plate configuration, and is parallel to the main body.

3. The electronic apparatus of claim 1, wherein the side block portion comprises a first side wall, a second side wall, a third side wall and a fourth side wall interconnecting with each other, an opening being defined between the first side wall and the fourth side wall for allowing the hook portion to slide through.

4. The electronic apparatus of claim 3, wherein the third side wall and a portion of the second side wall upwardly protrude out of the first side wall and the fourth side wall, the top block portion connecting with top surfaces of the protruding third side wall and the portion of the second side wall.

5. The electronic apparatus of claim 4, wherein the limiting portion comprises a protrusion protruding out therefrom, the protrusion abutting against the portion of the second side wall which protrudes out of the first side wall of the block portion.

6. The electronic apparatus of claim 1, further comprising a pressing key having an inclined sliding surface, the main body defining an operating hole, the pressing key being movably fastened in the operating hole of the main body, the sliding bar having an inclined cooperating surface for cooperating with the sliding surface of the pressing key.

7. The electronic apparatus of claim 1, further comprising an elastic member one end of which is fixed on the main body and the other end of which is fixed on the sliding bar.

8. The electronic apparatus of claim 7, wherein the main body further comprises a first orienting portion, the sliding bar comprising a second orienting portion and an elongated groove, the elastic member being disposed in the elongated groove, one end of the elastic member being fixed on the first orienting portion and the other end of the elastic member is fixed on the second orienting portion.

9. The electronic apparatus of claim 1, wherein the sliding bar further comprises an extending portion located between the limiting portion and the hook portion, the extending portion having a planar surface at a top end thereof, the planar surface being parallel to the limiting portion, the hook portion extending from one lateral side of the planar surface.

10. The electronic apparatus of claim 1, wherein the sliding bar defines a slug hole extending through the limiting portion and into the extending portion.

11. The electronic apparatus of claim 1, wherein the sliding bar defines a demould hole extending through the limiting portion and facing the hook portion.

12. The electronic apparatus of claim 1, wherein the main body comprises a base and an operating board fixed on the base, the fastening hole being defined in the operating board and the block portion being formed on the operating board, the sliding bar being movably fastened onto the operating board.

* * * * *